United States Patent [19]

Shimano

[11] 4,428,739
[45] Jan. 31, 1984

[54] ROLLER CHAIN

[75] Inventor: Keizo Shimano, Sakai, Japan

[73] Assignee: Shimano Industrial Company Limited, Osaka, Japan

[21] Appl. No.: 288,516

[22] Filed: Jul. 30, 1981

[30] Foreign Application Priority Data

Aug. 8, 1980 [JP] Japan .................. 55-112887[U]

[51] Int. Cl.³ .................. F16H 13/02; B60S 1/62
[52] U.S. Cl. .................. 474/231; 305/11
[58] Field of Search .......... 474/92, 226, 228, 230, 474/231; 305/11

[56] References Cited

U.S. PATENT DOCUMENTS 2,568,649 9/1951 McIntosh et al. .......... 474/231
3,344,677 10/1967 Morse .......... 474/231 X

FOREIGN PATENT DOCUMENTS 8583 of 1891 United Kingdom ............ 474/231
18169 of 1899 United Kingdom ............ 474/231
217483 6/1924 United Kingdom ............ 474/230

Primary Examiner—Lawrence J. Staab
Assistant Examiner—L. D. Shannon, III
Attorney, Agent, or Firm—Stevens, Davis, Miller & Mosher

[57] ABSTRACT

A roller chain comprising outer link plates, inner link plates, pins, bushes, and rollers, the bushes each including an elastic member so that a total axial length of the bush including the elastic member controls an interval between opposite inner link plates, the elastic member being elastically deformed to change the interval, the outer surfaces of the inner link plates being kept in close proximity to the inner surfaces of the outer link plates to avoid above entry of dirt or sand therebetween.

7 Claims, 7 Drawing Figures

ROLLER CHAIN

FIELD OF THE INVENTION

This invention relates to a roller chain used mainly as a drive chain for a bicycle, and more particularly to a roller chain comprising a number of pairs of outer link plates, a number of pairs of inner link plates, pins for connecting these link plates respectively, bushes, and rollers supported rotatably to the pins through the bushes.

BACKGROUND OF THE INVENTION

Conventionally, a roller chain constructed as described-above is well-known, with the link plates being connected in a endless manner the roller chain is carried across a front chain gear and a rear chain gear, as shown in FIG. 7, so that a driving force is transmitted from the former gear to the latter gear.

As the roller chain circles around both the chain gears the outer link plates and inner link plates rotate relative to each other around the pins. To assist this rotation gaps are usually provided between the inner surfaces outer link plates and the outer surfaces inner link plates, and between the outer peripheries of the pins and the inner peripheries of the bushes to provide a smooth relative rotation of each outer link plate and inner link plate. Unfortunately, dirt or sand can enter the gaps between the pins and the bushes through the gaps between the outer and inner link plates. As a result, the frictional resistance between the pins and bushes increases producing noise and causing frequent wear and premature chain failure.

In order to overcome the above problem, a roller chain has been proposed which interposes elastic sealing members between the inner surfaces of outer link plates and the outer surfaces of the inner link plates, the elastic members always contacting with the opposite surfaces of both the link plates to prevent dirt or sand from entering the gaps between the pins and the bushes.

Such a roller chain, however, considerably increases the frictional resistance between the outer link plates and the inner link plates although the pins and bushes are free from added wear caused by dirt or sand, resulting in an unsmooth relative rotation between the inner and outer link plates.

Hence, the conventional chain, when carried across a front gear $G_1$ and multi-stage rear gears $G_2$ of a bicycle as shown in FIG. 7, cannot be switched smoothly among the rear gear through a derailleur for changing speed. Also, the chain, at its slack side, does not smoothly disengage from the front gear $G_1$ and is raised in the rotating direction thereof to cause a wavelike motion, thus not only deteriorating the steerability of the bicycle but also producing noise.

SUMMARY OF THE INVENTION

In the light of the above problems, this invention has been designed. An object of the invention is to provide a roller chain which is capable of avoiding an entry of dirt or sand into a gap between the outer periphery of each pin connecting the inner and outer link plates and the inner periphery of each bush, and of restricting a frictional resistance between the inner surface of each outer link plate and the outer surface of each inner link plate.

This invention has been so designed that in a roller chain comprising a number of pairs of outer link plates, a number of pairs of inner link plates, pins for connecting both the outer and link plates, bushes sleeved onto the pins, and rollers supported rotatably to the pins through the bushes respectively, the bushes are provided wih elastic members extending lengthwise of the bushes respectively so that a total axial length of each bush including each elastic member controls an interval between the opposite inner link plates, this interval being adapted to change through elastic deformation of the elastic member, and the outer surfaces of the inner link plates are kept in close proximity to the inner surfaces of the outer link plates.

An embodiment of the invention has each bush divided lengthwise thereof and each elastic member interposed between the divided portions of the bush, the elastic member being mainly of a short tubular shape.

The elastic member which is deformable to change the interval between the opposite inner link plates can keep to a minimum (including zero) a gap between the outer surface of each inner link plate and the inner surface of each outer link plate, thereby reliably preventing dirt or sand from entering a gap between the bush and the pin. Also, no conventional sealing members are interposed between the inner and outer link plates. One other words, the outer surfaces of the inner link plates and the inner surfaces of the outer link plates are in metal contact with each other and the elastically deformable member can axially displace the inner link plate, whereby each link plate can always smoothly rotate relative to each other.

Furthermore, the elastic member of the invention is made smaller in a radial thickness than the bush, so that the roller, when subjected to a load, elastically deforms the elastic member, thereby enlarging the interval between the opposite inner link plates. Hence, the gap between the outer surface of the inner link plate and the inner surface of the outer link plate is reduced to further reliably prevent an entry of dirt or sand into the gap.

These and other objects of the invention will become more apparent in the detailed description and examples which follow.

DETAILED DESCRIPTION OF THE INVENTION

Figure 1:
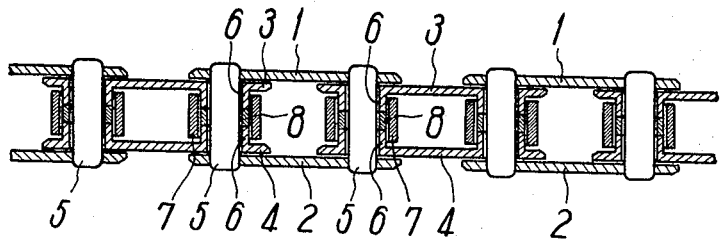
FIG. 1 is a partially omitted cross-sectional view of an embodiment of a roller chain of the invention.

Referring to the drawings, reference numerals 1 and 2 designate a pair of outer link plates opposite to each other at a fixed interval, 3 and 4 designate a pair of inner link plates disposed inside of the outer link plates 1 and 2 respectively, 5 designates a pin mounted on both ends of the outer link plates 1 and 2 and connecting each link plate, and 6 designates a bush mounted on both ends of the inner link plates 3 and 4, the bush 6 rotatably supporting a roller 7.

The bush 6 shown in the drawing is integral with the inner link plates 3 and 4 and divided at the lengthwise central portion so that a short tubular elastic member 8 is interposed between the ends of the divided portions.

Figure 2:
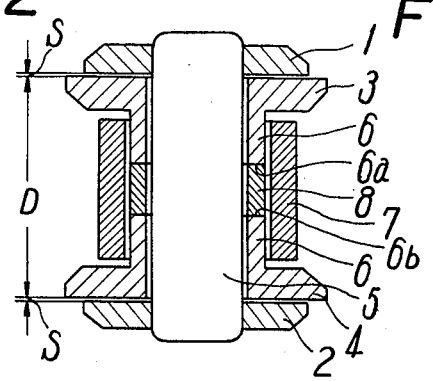
FIG. 2 is a partially enlarged sectional view of the FIG. 1 embodiment.

The elastic member 8 is made mainly of rubber and is integral with the bush 6, which is elastically deformable in an axial direction to control an interval D between the inner link plates 3 and 4. Hence, the outer surface of inner link plates 3 and 4 having the interval D therebetween controlled through the bush 6 are kept in close proximity to the inner surfaces of outer plates 1 and 2, thereby reducing a gap S between the outer surface of each inner link plate 3 or 4 and the inner surface of each outer link plate 1 or 2 to a minimum as shown in FIG. 2.

This construction prevents dirt or sand from entering a gap between the pin 5 and the bush 6 through the gaps S between the inner surfaces of outer link plates 1 and 2 and the outer surfaces of inner link plates 3 and 4. Also, even when the inner surfaces of outer link plates 1 and 2 contact with the outer surfaces of inner link plates 3 and 4, a frictional resistance created between each inner link plate 3 or 4 and each outer link plate 1 or 2, can be restricted.

In other words, since conventional sealing members are not used, the link plates contact with each other directly in a metal touch. Furthermore, the elastic member 8 allows the inner link plates 3 and 4 to move inwardly from the outer link plates 1 and 2. Hence, the frictional resistance between the outer and inner link plates, even when they contact with each other, can be minimized, whereby a smooth relative rotation of each link plate occurs.

The roller chain constructed as just described, when made endless and used as a bicycle driving chain carried across a front gear $G_1$ and multi-stage rear gears $G_2$, also can be smoothly switched to a selected gear by means of a rear derailleur RD. In this instance, the roller chain disengages well from the front gear $G_1$ without the occurrence of wavelike motion at the slack side of the chain.

Alternatively, the bush 6 may be a separate element from the inner link plates 3 and 4 so as to be fixed thereto. Also, the elastic member 8 need not be cylindrical, or it may be porous containing grease.

Figure 3:
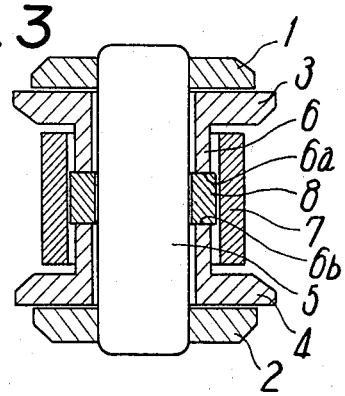
FIG. 3 is a partially enlarged sectional view of a modified embodiment of the invention.

The elastic member 8, when made cylindrical, may be substantially equal in thickness to the bush 6 as shown in FIG. 2, but it is preferable that the elastic member 8 is made larger in thickness that the bush 6 as shown in FIG. 3. In other words, it is preferable that the cylindrical elastic members 8 are made smaller in an inner diameter than the bush 6, and made larger in an outer diameter than the same, so that the inner and outer peripheries of elastic member 8 are kept in close proximity to the outer periphery of pin 6 and to the inner periphery of roller 7.

Figure 4:
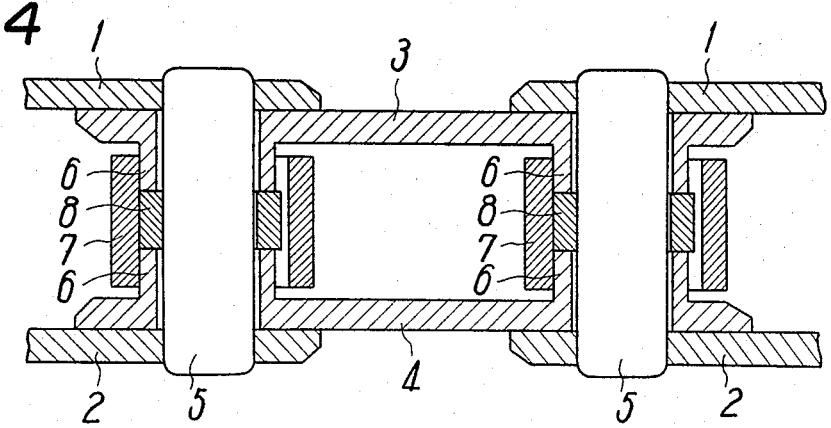
FIG. 4 is a view explanatory of an elastic member in FIG. 3, in condition of being elastically deformed.

In this instance, the roller 7, when subjected to a load, contacts at the inner periphery with the elastic member 8 so that the elastic member 8, as shown in FIG. 4, is elastically deformed to be axially swollen at both axial ends, the divided portions of bush 6 being moved axially outwardly with respect to the pin 5, thereby enlarging the interval D between the inner plates 3 and 4. As a result, the outer surfaces of inner link plates 3 and 4 press-contact with the inner surfaces of the outer link plates 1 and 2 to close the gaps S between the inner link plates 3 and 4 and the ouer link plates 1 and 2, thereby avoiding the entry of dirt or sand into the gaps S.

The roller 7 at the portions of the chain applied with a driving force are subjected to the load. The roller chain, when used for a bicycle, is applied with the driving force at the portions engaging with an upper quarter of the front chain gear $G_1$ and with that of the rear chain gear $G_2$, and at the portion at the tight side of the chain across both the gears $G_1$ and $G_2$. The rollers 7 positioned at the above positions are subjected to the load to deform the elastic members 8, so that the inner link plates 3 and 4 are enlarged of the interval D therebetween and contact with the outer link plates 1 and 2, thereby effectively preventing dirt or sand from entering into the gaps between the pins 5 and the bushes 6.

Since dirt or sand splashed-up mainly by a rear wheel drops on the rear chain gear $G_2$ and the roller chain carried therewith so as to enter the gap between the pin 5 and the bush 6, the gaps S between the inner surfaces of outer link plates 1 and 2 and the outer surfaces of inner link plates 3 and 4, when surely closed, can prevent the entry of dirt or sand into the former gap.

Figure 5:
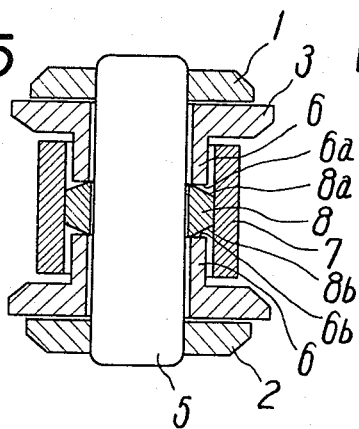
FIGS. 5 and 6 are partially enlarged sectional views of other modified embodiments of the invention.

As shown in FIG. 5, the elastic member 8 is preferably tapered at 8a and 8b radially outwardly at both axial sides thereof, thereby being readily deformable when subjected to a load.

Figure 6:
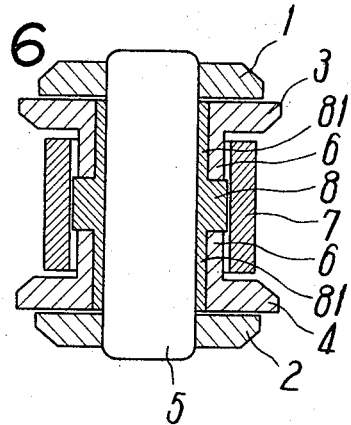
Figure 7:
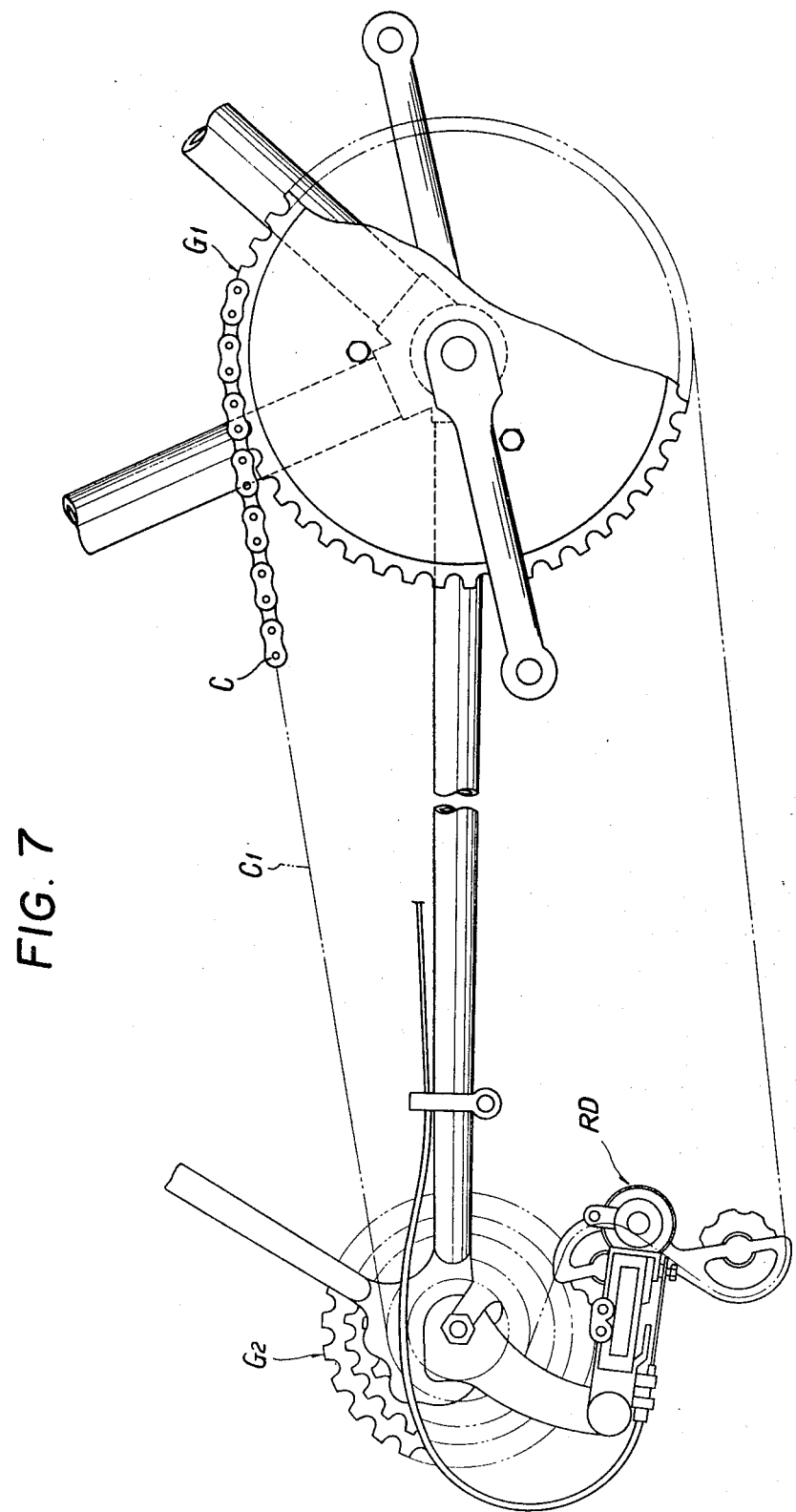
FIG. 7 is a schematic view explanatory of the roller chain when in use.

Alternatively, the elastic member 8 may, as shown in FIG. 6, be provided at both axial sides integrally with a sealing tube 81 interposed between the outer periphery of pin 5 and the inner periphery of bush 6 so that the sealing tube 81 can prevent dirt or sand from entering the gap between the pin 5 and the bush 6.

As seen from the above, the roller chain of the invention provides elastic members 8 constructed as decribed above at the bushed 6 to minimize the gaps S between the outer surfaces of inner link plates 3 and 4 and the inner surfaces of outer link plates 1 and 2, so that dirt or sand is kept out of the gaps between the pins 5 and the bushes 6, whereby the pins 5 and bushes 6 are free from the wear and may withstand long use.

Furthermore, although the gap S is a minimum, each deformable elastic member 8 allows the inner link plates 3 and 4 to escape from the outer link plates 1 and 2, thereby performing a smooth relative rotation therebetween. Hence, when a derailleur is used for changing speed, the roller chain can be switched smoothly to a selected rear gear. Also, the chain, at its slack side, will disengages well from the front gear so as to eliminate conventional wavelike motion, thereby improving steerability of the bicycle and avoiding the production noise.

Although several embodiments have been described, they are merely exemplary of the invention and not to be constructed as limiting, the invention being defined solely by the appended claims.

What is claimed is:

1. A roller chain comprising: a number of pairs of outer link plates, a number of pairs of inner link plates, pins connecting said outer and inner link plates, bushes fitted onto said pins, and rollers supported rotatably on said bushes, respectively, each of said bushes including an elastic member extending lengthwise thereof so that a total axial length of each of said bushes including that of said elastic member controls the spacing between pairs of said inner link plates opposite to each other, said elastic member being elastically deformable to change said spacing, said inner link plates at the outer surfaces thereof being opposed to and in close proximity to the inner surfaces of said outer link plates respectively.

2. A roller chain according to claim 1, wherein said bushes are lengthwise divided, said elastic members being interposed between ends of said divided portions.

3. A roller chain according to claim 2, wherein said elastic members each have a larger thickness radial of said bush than a thickness of said bush so that each of said rollers, when subjected to a load, contacts at the inner periphery thereof with a said elastic member, whereby said elastic member is elastically deformed to enlarge the spacing between said opposite inner link plates.

4. A roller chain according to claim 3, wherein each said elastic member is tapered at both axial sides opposite to the ends of said divided portions at said bush, said tapered faces extending radially outwardly of said bush and toward the axial center thereof.

5. A roller chain according to any one of claims 1, 2, 3 or 4 wherein each of said elastic members is formed in a short cylindrical shape.

6. A roller chain according to claim 5, wherein each of said elastic members is provided with a sealing tube interposed between the outer periphery of said pin and the inner periphery of said bush.

7. A roller chain according to claim 1, wherein said bushes are integral with said inner link plates respectively.

* * * * *